(12) United States Patent
Bell et al.

(10) Patent No.: US 7,790,278 B2
(45) Date of Patent: *Sep. 7, 2010

(54) SYSTEM FOR DELIVERY OF FIBERS INTO CONCRETE

(75) Inventors: Robert Irvin Bell, Collierville, TN (US); Jeffery Todd Cook, Germantown, TN (US); Judson Fidler, Oakland, TN (US); Gerald Hunt Morton, Germantown, TN (US); Howard Leon Schoggen, Southaven, MS (US)

(73) Assignee: Buckeye Technologies Inc., Memphis, TN (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/569,876

(22) PCT Filed: Aug. 27, 2004

(86) PCT No.: PCT/US2004/028096

§ 371 (c)(1),
(2), (4) Date: May 7, 2007

(87) PCT Pub. No.: WO2005/021458

PCT Pub. Date: Mar. 10, 2005

(65) Prior Publication Data

US 2007/0190300 A1 Aug. 16, 2007

Related U.S. Application Data

(60) Provisional application No. 60/498,782, filed on Aug. 29, 2003.

(51) Int. Cl.
*C04B 14/00* (2006.01)
*B32B 13/02* (2006.01)

(52) U.S. Cl. .................................. 428/294.7; 106/726

(58) Field of Classification Search ....................... None
See application file for complete search history.

(56) References Cited

U.S. PATENT DOCUMENTS

| | | |
|---|---|---|
| 1,048,913 A | 12/1912 | Stuart et al. |
| 1,349,901 A | 8/1920 | Meischke-Smith |
| 1,571,048 A | 1/1926 | Garrow |
| 1,633,219 A | 6/1927 | Martin |
| 1,913,707 A | 6/1933 | Etheridge |

(Continued)

FOREIGN PATENT DOCUMENTS

CH 216902 9/1941

(Continued)

OTHER PUBLICATIONS

U.S. Appl. No. 60/405,784, Cook, et al.

(Continued)

*Primary Examiner*—D. Lawrence Tarazano
*Assistant Examiner*—Camie S Thompson
(74) *Attorney, Agent, or Firm*—Baker Botts L.L.P.

(57) ABSTRACT

The present invention provides for twisted and rectangular dice forms of sheeted fibrous materials and a process for making the dice forms. Specifically, the invention teaches the use of dice forms and sheet materials in construction and cementitious materials.

19 Claims, 2 Drawing Sheets

U.S. PATENT DOCUMENTS

| | | | |
|---|---|---|---|
| 2,023,800 A | 12/1935 | Williamson | |
| 2,153,837 A | 4/1939 | Hybinette | |
| 2,377,484 A | 6/1945 | Elmendorf | |
| 2,677,955 A | 5/1954 | Constantinesco | |
| 3,264,125 A | 8/1966 | Bourlin | |
| 3,679,445 A | 7/1972 | Howe | |
| 3,753,749 A | 8/1973 | Nutt et al. | |
| 3,829,057 A * | 8/1974 | Fuchs | 249/175 |
| 3,860,180 A | 1/1975 | Goldhammer | |
| 4,039,345 A | 8/1977 | Emig et al. | |
| 4,089,439 A | 5/1978 | Dearlove et al. | |
| 4,092,737 A | 5/1978 | Sandell et al. | |
| 4,133,928 A | 1/1979 | Riley et al. | |
| 4,188,454 A | 2/1980 | Foley et al. | |
| 4,261,754 A | 4/1981 | Krenchel et al. | |
| 4,287,020 A | 9/1981 | Moore | |
| 4,287,365 A | 9/1981 | Becker et al. | |
| 4,306,911 A | 12/1981 | Gordon et al. | |
| 4,310,478 A | 1/1982 | Balslev et al. | |
| 4,369,201 A | 1/1983 | Kober | |
| 4,400,217 A | 8/1983 | Kober et al. | |
| 4,406,703 A | 9/1983 | Guthrie et al. | |
| 4,483,727 A | 11/1984 | Eickman et al. | |
| 4,486,501 A | 12/1984 | Holbek et al. | |
| 4,510,020 A | 4/1985 | Green et al. | |
| 4,524,101 A | 6/1985 | Eickman et al. | |
| 4,647,505 A | 3/1987 | Blackie et al. | |
| 4,655,111 A | 4/1987 | Blaker et al. | |
| 4,671,413 A | 6/1987 | Peterson | |
| 4,828,618 A | 5/1989 | De Chiffre et al. | |
| 4,861,812 A | 8/1989 | McAlphin et al. | |
| 4,923,126 A | 5/1990 | Lodovico et al. | |
| 4,927,462 A | 5/1990 | Sugama | |
| 4,961,790 A | 10/1990 | Smith et al. | |
| 4,968,561 A | 11/1990 | Mizobe et al. | |
| 4,985,119 A | 1/1991 | Vinson et al. | |
| 5,000,824 A | 3/1991 | Gale et al. | |
| 5,021,093 A | 6/1991 | Beshay et al. | |
| 5,096,539 A | 3/1992 | Allan | |
| 5,102,596 A | 4/1992 | Lempfer et al. | |
| 5,120,367 A | 6/1992 | Smith et al. | |
| 5,196,061 A | 3/1993 | Thomas et al. | |
| 5,203,629 A | 4/1993 | Valle et al. | |
| 5,223,090 A | 6/1993 | Klungness et al. | |
| 5,224,595 A | 7/1993 | Sugimoto et al. | |
| 5,224,774 A | 7/1993 | Valle et al. | |
| 5,232,779 A | 8/1993 | Spehner et al. | |
| 5,292,078 A | 3/1994 | Lodovico et al. | |
| 5,320,851 A | 6/1994 | de Mars et al. | |
| 5,345,628 A * | 9/1994 | Keefer | 5/682 |
| 5,362,562 A | 11/1994 | Evans et al. | |
| 5,385,978 A | 1/1995 | Evans et al. | |
| 5,399,195 A | 3/1995 | Hansen et al. | |
| 5,453,310 A | 9/1995 | Andersen et al. | |
| 5,480,256 A | 1/1996 | Itsekson et al. | |
| 5,492,759 A | 2/1996 | Eriksson et al. | |
| 5,494,748 A | 2/1996 | Spehner et al. | |
| 5,561,173 A | 10/1996 | Dry | |
| RE35,460 E | 2/1997 | Klungness et al. | |
| 5,601,921 A | 2/1997 | Eriksson et al. | |
| 5,643,359 A | 7/1997 | Soroushian et al. | |
| 5,728,209 A | 3/1998 | Bury et al. | |
| 5,785,419 A | 7/1998 | McKelvey | |
| 5,795,515 A | 8/1998 | Fischer et al. | |
| 5,807,458 A | 9/1998 | Sanders et al. | |
| 5,851,281 A | 12/1998 | Alves et al. | |
| 5,897,701 A | 4/1999 | Soroushian et al. | |
| 5,897,928 A | 4/1999 | Sanders et al. | |
| 5,931,610 A | 8/1999 | Rixom et al. | |
| 5,985,449 A | 11/1999 | Dill | |
| 5,989,335 A | 11/1999 | Soroushian et al. | |
| 6,030,447 A | 2/2000 | Naji et al. | |
| 6,074,524 A | 6/2000 | Wu et al. | |
| 6,138,430 A | 10/2000 | Van Acoleyen et al. | |
| 6,159,335 A | 12/2000 | Owens et al. | |
| 6,183,123 B1 | 2/2001 | Sniegowski et al. | |
| 6,201,050 B1 | 3/2001 | Kaiser et al. | |
| 6,270,883 B1 | 8/2001 | Sears et al. | |
| 6,283,327 B1 | 9/2001 | Rubtsov | |
| 6,302,954 B1 | 10/2001 | Lunkenheimer et al. | |
| 6,340,408 B1 | 1/2002 | Norlander et al. | |
| 6,345,777 B1 | 2/2002 | Leaver et al. | |
| 6,346,146 B1 | 2/2002 | Duselis et al. | |
| 6,348,093 B1 | 2/2002 | Rieder et al. | |
| 6,379,457 B1 | 4/2002 | Yamamoto et al. | |
| 6,503,319 B1 | 1/2003 | Courage et al. | |
| 6,550,362 B1 | 4/2003 | Galinat et al. | |
| 6,554,465 B2 | 4/2003 | Cruso | |
| 6,562,430 B1 | 5/2003 | Leon | |
| 6,562,743 B1 | 5/2003 | Cook et al. | |
| 6,569,233 B2 | 5/2003 | Macklin et al. | |
| 6,676,744 B2 | 1/2004 | Merkley et al. | |
| 6,676,745 B2 | 1/2004 | Merkley et al. | |
| 6,758,897 B2 * | 7/2004 | Rieder et al. | 106/802 |
| 6,770,576 B2 | 8/2004 | Cook et al. | |
| 6,777,103 B2 | 8/2004 | Merkley et al. | |
| 6,790,275 B2 | 9/2004 | Macklin et al. | |
| 6,808,560 B2 | 10/2004 | Macklin et al. | |
| 6,933,038 B2 | 8/2005 | Nanko et al. | |
| 6,942,726 B2 * | 9/2005 | Cook et al. | 106/644 |
| 7,179,348 B2 | 2/2007 | Jewell et al. | |
| 7,344,593 B2 | 3/2008 | Luo et al. | |
| 2001/0051266 A1 | 12/2001 | Rieder et al. | |
| 2002/0007926 A1 | 1/2002 | Jewell et al. | |
| 2002/0112827 A1 | 8/2002 | Merkley et al. | |
| 2007/0089645 A1 * | 4/2007 | Morton et al. | 106/805 |

FOREIGN PATENT DOCUMENTS

| | | |
|---|---|---|
| DE | 4321024 | 1/1995 |
| EP | 235577 | 9/1987 |
| EP | 0427317 | 5/1991 |
| EP | 0548371 | 6/1993 |
| GB | 2081762 | 2/1982 |
| JP | 54091520 | 7/1979 |
| JP | 59018153 | 1/1984 |
| WO | WO-00/38607 | 7/2000 |

OTHER PUBLICATIONS

Database WPI, Section Ch, Week 198025, Derwent Publications Ltd., London, GB, Class E12, AN 1980-44381C, XP002266243 & JP 55 063248 A (Matsushita Electric Works Ltd.), May 13, 1980.

* cited by examiner

SYSTEM FOR DELIVERY OF FIBERS INTO CONCRETE

CROSS-REFERENCE TO RELATED APPLICATIONS

This application is a 371 National Phase of International Application No. PCT/US04/28096, filed Aug. 27, 2004, which claims priority under 35 U.S.C. §119, based on U.S. Provisional Application Ser. No. 60/498,782 filed Aug. 29, 2003, which is hereby incorporated by reference in its entirety.

FIELD OF THE INVENTION

This invention relates to a system for the delivery of reinforcing fibers into cementitious and other construction materials. In particular, the invention relates to methods and apparatus in which regular production, high density, cellulose pulp sheets are converted to a form that is easily delivered and dispersed in fresh concrete, and to equipment for economical and facile delivery of the improved form into ready-mix concrete applications.

BACKGROUND OF THE INVENTION

The desirability of employing fibrous reinforcing material in concrete and other cementitious building materials has been known for a number of years. In many instances, the use of fiber reinforcing material reduces or eliminates the need for reinforcing rods while maintaining improved shrinkage crack resistance. The fiber-reinforced material can often be formed at lower cost than similar material containing steel rod or wire mesh reinforcement. Where concrete is used in applications that are exposed, such as roadways, the presence of the fibers at the surface exposed to the roadway also provides improved wear resistance.

One difficulty that has inhibited use of fiber reinforced materials is the tendency of the fibers to adhere to each other and form balls after being delivered into construction mixtures when they are not fully wetted by the construction mixture. The result of balling is poor matrix to fiber bonding and a corresponding decrease in strength of the finished construction material. Moreover, where the balls are of significant size, a partial void in the material is formed which results in a defect or weak spot in the finished material.

Cellulose and mineral fibers are commonly used to modify the rheological properties of liquid systems, including those based on cement and water, and those based on bitumen. The fibers have a gelling or thickening effect on these systems which may include, for example, a cement-based tile adhesive, concrete, or a bituminous road surfacing compound. Cellulose and mineral fiber usage has increased partly due to the demise of asbestos fiber.

Cellulose fiber is often supplied in dry, compressed bales which may be from about 1 Kg to about 400 Kg in weight and have a density of from about 0.4 to about 0.9 g/cc. To be effective as a reinforcing material, the fibers must be delivered into the mixture and be dispersed therein. Cellulose fiber is also supplied in rolls. One problem in the state of the art is the length of time required for uniform dispersion of the fibers once they are delivered into the construction mixture.

There are three main methods for adding fiber to cementitious and other construction mixtures. In one method, bales may be added directly to a mixer. Thus, in the case of hot bitumen mixtures, the whole bale including polyethylene packaging is added, the plastic quickly dissolving into the hot liquid bitumen. Alternatively, and particularly in the use of dry powder mixes, the fiber is emptied from the package directly into the mixer. Or, the fiber is supplied via a hopper and screw arrangement, possibly after a weighing operation to obtain the exact quantity required for a batch. These prior art methods are labor intensive, and often require an operator to work very close to mixing machinery. There are also the environmental problems of dust, fumes and noise for methods that require complicated procedures and extensive mixing times.

U.S. Pat. Nos. 1,048,913; 1,349,901; 1,571,048; 1,633,219; 1,913,707; 2,377,484; and 2,677,955 relate to the use of various materials including fibers in concrete. Early efforts were aimed at improving crack resistance and improving the energy absorption of concrete masses. U.S. Pat. Nos. 4,188,454; 4,287,365; 4,287,020; 4,310,478; 4,369,201; 4,4,400,217; 4,483,727; 4,524,101; 4,524,101; 4,861,812; 4,985,119; 4,968,561; 5,000,824; 5,196,061; 5,362,562; 5,385,978; 5,399,195; and 5,453,310, 5,643,359, 5,897,701, all of which are hereby incorporated by reference in their entirety, relate to various efforts to provide improved reinforced materials.

SUMMARY OF THE INVENTION

This invention provides several systems for solving the prior art problems of lack of dispersion and inadequate mixing of reinforcing fibers in construction mixtures. In one aspect, this invention provides a system for the conversion of a high density dry pulp sheet to a readily dispersible form by use of a dicer or shredder. The time required for dispersion and complete mixing of the fibers into a cementitious mixture is greatly reduced.

In one aspect, this invention provides a twisted dice form of sheeted fibrous material in which the twisted dice has a generally rectangular shape with an unkinked length of from about 10 mm to about 100 mm, a width of from about 2 mm to about 15 mm and a thickness of from about 1 mm to about 6 mm, a density of from about 0.1 g/cc to about 0.5 g/cc, and the dice has one or more twists of 45 degrees or more along its length. Related to this aspect of this invention is a process for the production of a twisted dice form of a sheeted fibrous material comprising passing the sheeted fibrous material through a transverse shredder to produce twisted dice which has a generally rectangular shape with an unkinked length of from about 10 mm to about 100 mm, a width of from about 2 mm to about 15 mm and a thickness of from about 1 mm to about 6 mm, a density of from about 0.1 g/cc to about 0.5 g/cc, and the dice has one or more twists of 45 degrees or more along its length. Related to this aspect is a construction material containing dispersed therein twisted dice, including a cementitious mixture containing twisted dice.

In an alternative embodiment, this invention provides a rectangular dice form of sheeted fibrous material in which the rectangular dice has a generally rectangular shape with a length of from about 4 mm to about 10 mm, a width of from about 3 mm to about 8 mm and a thickness of from about 1 mm to about 2 mm, and a density of from about 0.4 g/cc to about 0.6 g/cc. Related to this embodiment of this invention is a process for the production of a rectangular dice form of a sheeted fibrous material where the sheeted fibrous material is passed through a dicer or shredder to produce rectangular die which has a generally rectangular shape with a length of from about 4 mm to about 10 mm, a width of from about 3 mm to about 8 mm and a thickness of from about 1 mm to about 2 mm, and a density of from about 0.4 g/cc to about 0.6 g/cc. Related to this aspect is a construction material containing dispersed therein rectangular dice, including a cementitious mixture containing rectangular dice.

In another aspect, this invention provides a form of sheeted fibrous material which has a weight of from about 0.01 g to about 0.5 g and which has a fiber form dispersion coefficient ("FFDC") of about 0.50 or greater. Desirably, the forms of sheeted fibrous material are easily dispersable in construction materials, wherein the form of sheeted fibrous material, upon addition to a concrete mixing machine, is about 99 percent or more dispersed into individual fibers within a mixing time of about five minutes or less.

In another embodiment, this invention provides a cementitious material comprising:
(A) cement,
(B) cellulose pellets, and
(C) optionally, sand, aggregate or sand and aggregate.

In another aspect, this invention provides a method of dispersing fibers in a cementitious material by providing a cementitious material and adding dice forms, twisted or rectangular, and mixing the cementitious material until the dice forms are completely dispersed as individual fibers uniformly in the cementitious material.

DETAILED DESCRIPTION OF THE PREFERRED EMBODIMENTS

Figure 1:
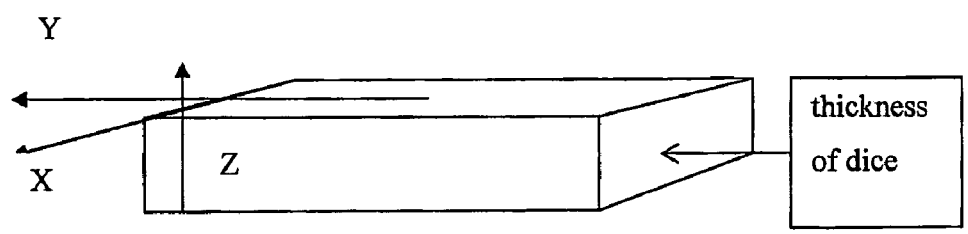
FIG. 1 depicts the directional axes for a sample die. The Z-direction is the direction perpendicular to the forming wire surface on a paper machine or airlaid machine on which the cellulose or other fibrous web or sheet is made. X and Y directions correspond to the machine direction and cross direction in terms of material produced on a paper machine in the horizontal plane of the wire.

This invention provides a system and apparatus for the production of a twisted dice form of sheeted cellulosic materials, which is suitable for delivery into construction mixtures including cementitious materials such as concrete. Twisted dice are produced by means of a transverse shredder. The term "dice" as used herein may be singular or plural and refers to a small piece of sheeted fibrous material.

A transverse shredder is a conventional shredder to which has been added means for an additional process. Built into and placed at determinate points around the circumference of each cutting disk are cutting notches. As the material delivered into the shredder is being cut into long strips, it comes into contact with these notches which effect a transverse cut across the strip, thus reducing the material to rectangular pieces of various lengths, the individual lengths being determined by the number and placement of the transverse cutting notches. There are comparatively few moving parts and the machine, including motor and drive mechanism, can easily fit on a desktop.

Allegheny Paper Shredders Corporation (Delmont, Pa.) manufactures a transverse shredder with the most notable previous application for shredding plastic containers and aluminum cans in consumer recycling operations.

Rectangular dice may be produced by a variety of dicers known in the art, such as, for example, a dicer from Shepherd Specialty Papers, Inc. (Watertown, Tenn.), which cuts a cellulose comminution sheet into strips followed by transverse cutting to produce rectangular dice. Typically, a plurality of narrow strips are produced in a twin roll slitting section which produces strips traveling in the machine direction. The strips are then fed to a cutting knife which cuts the strips in the cross direction to produce rectangular dice.

In an alternative embodiment of this invention, cellulose in the form of pellets is incorporated into a cementitious mixture. Methods of producing cellulose pellets are known in the art, for example, as taught in U.S. Pat. No. 6,270,883, which is hereby incorporated herein by reference in its entirety.

U.S. Pat. No. 6,562,743 relates to absorbent structures which contain chemically treated fibers bound with a polyvalent cation-containing compound and an ionizable acid, while U.S. Pat. No. 6,770,576 relates to the fibers themselves. U.S. patent application Ser. No. 10/638,274 filed Aug. 8, 2003, claiming priority from U.S. provisional application 60/405,784 filed Aug. 23, 2002 relates to the use of these fibers in cementitious materials. These patents and applications are hereby incorporated herein by reference in their entirety. The chemically treated fiber is available from Buckeye Technologies Inc. (Memphis, Tenn.) and its affiliates as CARESSA® for use in absorbent products. The chemically treated fibers disclosed therein for use in cementitious materials are referred to herein as CF-16, and is available as BUCKEYE ULTRAFIBER 500™.

A wide variety of types and grades of fibrous material are produced in baled sheet and roll form by the global paper industry. These materials are from various sources, natural and synthetic, with cellulosics being derived primarily from wood pulp and cotton linters. Sheet thicknesses range from about 0.5 mm to about 2.0 mm, with more common commercial products being from about 0.8 mm to about 1.5 mm. Any of these sheeted fibrous materials may be used in the practice of this invention.

The invention may be better understood by the following Examples which illustrate the invention, but are in no way limiting.

EXAMPLES

Example 1

Twisted Dice

Sheets of CF-16 of the dimension 17.8 cm (7 inches)×76.2 cm (30 inches) with a basis weight of 709 g/m² and a sheet density of 0.59 g/cm³ were fed one-by-one into an Allegheny shredder model RX-8 with a 2HP motor and an inlet slot of 20.3 cm (8 inches). The CF-16 sheet is converted into small, broken and twisted pieces of diced sheet material. Based on the average measurements of 50 samples of Allegheny CF-16 dice reported in Table 1 (below), the shape of the dice are typically about 6.3 mm (0.25 inch) wide, 3.0 cm (1.2 inch) in length (unlinked length), and 2.6 mm (0.1 inch) in thickness. The dice are obviously twisted and kinked, hence the description "twisted dice". The kinked length is about 2.5 cm (1.0 inch), which results in an elongation factor for the ratio of actual length divided by apparent kinked length of 1.2. The measured density of these twisted dice was about 0.22 g/cm³ on average. This corresponds to a reduction of the sheet density of about 62%.

These CF-16 twisted dice are considerably and obviously deformed, that is, they are twisted and torn rather than cleanly cut. They have jagged ends and edges and very often contain "twists" up to 90 degrees. The CF-16 sheets have a somewhat laminated characteristic from the manufacturing process. After being passed through the transverse shredder, the sheets show obvious and clear signs of partial delamination and this is reflected in the density measurement of the twisted dice pieces which is lower than the original CF-16 sheet.

As the twisted dice exit the Allegheny shredder, the material can be conveyed by any number of available conveying methods to a point of use. One desirable system uses a pneumatic tube and a blower. Such blower/tube combinations, which could include an air pulling as well as pushing character, are well known and readily available. Tash Engineering (Sumas, Wash.) manufactures one such system used to convey fibers to concrete. This system uses a type of tubing that can be routed as needed throughout a plant installation up to forty feet from shredder output to point of discharge. A discharge chute or foil may be installed to direct the dice to an exact discharge location. This may be necessary, for example, if the material is to be loaded directly into the feed hopper of a concrete truck. Such feed hoppers are small and other materials such as cement, aggregate, water and admixture chemicals, are often charged simultaneously with fibers. Alternatively, the tubing can discharge material at any suitable or desirable location upstream of the concrete truck itself.

There is a requirement in any fiber use to know the amount of fibers used per batch. This system uses a simple time metric. That is, the material manufactured in sheet form has a consistent basis weight. By measuring the time that the material is being shredded, a total weight can be easily determined. A truckload of ten tons of concrete would typically use fifteen pounds of fibers. A shredder of the kind described made by Allegheny with an eight inch inlet width and shredding material of seven inches in width, has easily enough capacity to meet a truck cycle rate of one every three minutes.

An important advantage of this system is transparency to the operator. Through the use of ready-mix concrete batch plant computer controls, such as, for example, those manufactured by Alco, a plant operator can be provided with a ticket printed with such information as date, time, batch number, pounds of fibers added, and any other information pertinent to the producer and/or customer. This information is analogous to that now obtained for the addition of admixture chemicals and is useful for statistical analysis, cost analysis, customer appeal, quality control, etc.

Another important advantage is safety, since current producers are safety conscious and wish to protect their workers and have expressed interest in automated fiber feeders to improve safety and work efficiency. Many types of fibers are first bagged and then added directly to trucks by operators on a loading platform or the top of a concrete truck. These dangerous environments, with moving machinery, slip and fall hazards, etc., are eliminated with an automated system.

In operation, a roll is loaded onto a roll stand or arm. The operator locates and feeds the end of the roll into the shredder. At that point, human intervention ends until the end of the roll is reached. If the mix design calls for fibers, the computer control system that controls the addition of all other concrete materials will start the shredder and conveyor system simultaneously. Product will be self-pulled through the shredder, shredded, and out fed into the working conveyor system. In one embodiment, this will be a blower driven pneumatic tube. The material will be delivered through the tube to its desired destination. The computer will measure the amount of fiber delivered by the amount of time the shredder runs and can print a ticket stating that quantity delivered, if desired. A further control will determine the end of the roll and signal the operator that a new roll should be loaded for continued operation.

Example 2

Laboratory Procedure for Measuring Physical Properties of the CF-16 Twisted Dice and CF-16 Rectangular Dice The present example teaches how to derive the Fiber Form Dispersion Coefficient (FFDC). As demonstrated in FIG. 1, the Z-direction surface area factor is calculated as follows:

Z-Direction Surface Area Factor=Z-Direction Surface Area/Total Surface Area.

The Z-direction is the direction perpendicular to the forming wire surface on a paper machine or airlaid machine on which the cellulose or other fibrous web or sheet is made. When measuring dice, the Z-direction is the shortest measured dimension and corresponds to the thickness. X and Y directions correspond to the machine direction and cross direction in terms of material produced on a paper machine in the horizontal plane of the wire. In these examples, the width, X, is defined as the shorter of the X and Y dimensions. The length, Y, is defined as the longer measured dimension.

Calculations for surface area are as follows:

Z-Direction Surface Area(mm$^2$)=2[Thickness(mm)×Width(mm)]+2[Thickness(mm)×Length(mm)]

Total Surface Area(mm$^2$)=Z-Direction Surface Area+2[Width(mm)×Length(mm)]

Z-Direction Surface Area Factor(ZSAF)=Z-Direction Surface Area(mm$^2$)/Total Surface Area(mm$^2$)

Delamination or debulking of the fibrous sheet in the Z-direction accelerates dispersion into individual fibers. The higher the ZSAF value, the more likely the dice will acquire water and swell which results ultimately in dispersion. The ZSAF is a good indicator if a particular form of cellulose or other fibrous material will disperse in concrete within a short time period, for example, three minutes or less. However, the calculation does not take into consideration the weight of each dice.

The density must be considered along with the ZSAF. Dispersion of cellulose forms is a function of both ZSAF and density. Two dice of exactly the same dimensions have the exact same ZSAF, but if the weight of one dice is greater than the weight of the other, the heavier dice would require more time and energy to disperse in the construction material matrix.

A lower density for a sheeted fibrous material generally indicates a more open structure along the edges of the form or dice. It may indicate some degree of delamination. Wetting of the fibrous material at this edge is of paramount importance in the dispersion process when the fibrous material dice are delivered into a construction mixture. Wetting and subsequent swelling at this edge is favored by a more open structure, and, thus a lower density. On the other hand, a higher density indicates a compacted, more closed structure, which could be expected to be more difficult to wet and thus disperse the fibers.

The Fiber Form Dispersion Coefficient is calculated as follows:

Fiber Form Dispersion Coefficient(FFDC)=ZSAF/density(g/cc).

A desirable form of sheeted fibrous material will break apart into individual fibers and readily disperse into the construction matrix in a relatively short time. The Fiber Form Dispersion Coefficient, FFDC, is a good indicator of dispersion potential. The larger the FFDC value, the more readily the fibrous material in a particular form will distribute and disperse into individual fibers in a given time. The following examples demonstrate this correlation. The very low value of FFDC for large sheets of fibrous material correlates with the fact that sheets are not unsuccessfully dispersed when delivered into a construction mixture.

For a material, such as, for example, twisted dice and/or rectangular dice, which is produced from regular production sheeted fibrous material having a thickness of about 2.0 mm or less, desirably, from about 0.5 mm to about 2.0 mm, to have practical dispersion times of about 4 minutes or less in fresh construction mixtures, such as concrete, it is desirable that the form has an FFDC of about 0.30 or greater, more desirably, of about 0.40 or greater, even more desirably of about 0.50 or greater, still more desirably, of about 0.60 or greater, still even more desirably, of about 0:70 or greater, preferably, of about 0.80 or greater and more preferably, of about 0.90 or greater. For a fibrous sheeted material made of cellulose, the FFDC may be referred to as CFDC, the Cellulose Form Dispersion Coefficient.

Example 3

Twisted Dice

Fifty individual twisted dice were weighed using a digital analytical balance, Mettler Toledo Model AB204-S, that measures to the nearest $1/10,000$ of a gram. Once the weight was recorded in grams for a given individual twisted dice, the kinked or folded length was measured using a Peak Scale Loupe 10× magnifying unit, Model 2028. The dice was placed on a flat surface and the length in centimeters was measured from one end to the other end. The length of the dice is defined as the longest longitudinal distance, herein the Y direction. The given twisted dice was then extended so that the dice laid flat and the unkinked or unfolded length was measured to the nearest tenth of a centimeter. An elongation value was assigned to each of the fifty dice measured. The elongation value is calculated by dividing the kinked length into the unkinked length.

The number of folds, twists and kinks, herein collectively referred to as "twists", were also counted and reported per dice. A twist is defined as a deviation from the horizontal of 45 degrees or greater along the dice when the twist is placed lengthwise on a flat horizontal surface and an end of the twist is held flat against the surface. The given twisted dice was then transferred to an Ames Micrometer, Model BG2110-0-04, with a 1.9 centimeter diameter foot.

The thickness, herein the Z direction, was measured by centering the width of the twisted dice under the foot of the micrometer. The thickness was measured and recorded in millimeters to the nearest $1/100$ of a millimeter in at least two places along the length of the twisted dice. An average thickness was calculated and reported. The Peak Scale Loupe 10× unit was utilized to measure the width of each individual twisted dice in millimeters. The width is defined as the shortest horizontal distance, herein the X direction, of the twisted dice. The width was recorded and reported to the nearest tenth of a millimeter.

The density was calculated by taking the weight in grams and dividing by the area of the given dice in centimeters, using the unkinked length in centimeters multiplied by the width in centimeters. Then, the average thickness in centimeters of the given twisted dice was divided into the weight per area value to determine density in grams per cubic centimeter. The average density of the 50 individual twisted dice is termed the Form Apparent Density and is expressed in grams per cubic centimeter. For each given twisted dice, the total surface area was calculated. The Z-directional surface area was calculated for each given dice. The Z-Direction Surface Area Factor was then calculated for each twisted dice. Data was obtained for 50 individual twisted dice and the results were averaged and the standard deviation, maximum (high), minimum (low), mode, and coefficient of variance was calculated and reported. See Table 1 which shows physical properties data for n=50 twisted dice.

TABLE 1

Twisted Dice Form Physical Properties Data

| n | Weight (g) | Thickness (mm) 1 | 2 | 3 | Avg. Thick (mm) | Width (mm) | Kinked Length (cm) | Unkinked Length (cm) | Elongation Value (%) | # of Folds | Density (g/cc) | Total Surface Area (mm2) | Z-Directional Surface Area (mm2) | Z-Direction Surface Area Factor (ZSAF) |
|---|---|---|---|---|---|---|---|---|---|---|---|---|---|---|
| 1 | 0.20 | 2.68 | 2.73 | 3.51 | 2.97 | 6.0 | 3.2 | 4.7 | 1.47 | 3 | 0.239 | 878.5 | 175.0 | 0.20 |
| 2 | 0.11 | 2.54 | 3.48 | 2.9 | 2.97 | 6.1 | 2.7 | 3.1 | 1.15 | 1 | 0.196 | 598.8 | 128.4 | 0.21 |
| 3 | 0.10 | 2.14 | 2.67 | 2.34 | 2.38 | 5.8 | 3.0 | 3.2 | 1.07 | 1 | 0.226 | 551.4 | 103.9 | 0.19 |
| 4 | 0.12 | 2.2 | 2.91 | 2.99 | 2.70 | 6.2 | 3.0 | 3.6 | 1.20 | 2 | 0.199 | 674.3 | 130.7 | 0.19 |
| 5 | 0.05 | 2.02 | 2.09 | 1.72 | 1.94 | 5.0 | 2.6 | 3.2 | 1.23 | 2 | 0.161 | 463.8 | 81.6 | 0.18 |
| 6 | 0.10 | 2.68 | 2.79 | 2.29 | 2.59 | 6.0 | 2.5 | 3.2 | 1.28 | 2 | 0.201 | 580.6 | 113.8 | 0.20 |
| 7 | 0.09 | 2.65 | 2.29 | 2.65 | 2.53 | 6.3 | 2.7 | 2.9 | 1.07 | 1 | 0.195 | 544.0 | 105.2 | 0.19 |
| 8 | 0.17 | 2.32 | 1.93 | 2.36 | 2.20 | 5.5 | 2.8 | 3 | 1.07 | 2 | 0.468 | 486.4 | 90.3 | 0.19 |
| 9 | 0.15 | 3.47 | 2.96 |  | 3.22 | 7.0 | 2.7 | 2.8 | 1.04 | 1 | 0.238 | 617.1 | 135.0 | 0.22 |
| 10 | 0.11 | 1.88 | 2.7 | 2.63 | 2.40 | 6.1 | 2.8 | 2.9 | 1.04 | 1 | 0.259 | 522.5 | 99.0 | 0.19 |
| 11 | 0.10 | 2.21 | 2.46 | 1.47 | 2.05 | 6.5 | 2.7 | 3.2 | 1.19 | 1 | 0.235 | 573.6 | 92.1 | 0.16 |
| 12 | 0.08 | 2.7 | 2.9 |  | 2.80 | 7.8 | 1.7 | 2 | 1.18 | 1 | 0.183 | 467.7 | 99.7 | 0.21 |
| 13 | 0.17 | 3.29 | 4.05 | 1.49 | 2.94 | 6.7 | 2.4 | 2.9 | 1.21 | 2 | 0.297 | 598.8 | 124.8 | 0.21 |
| 14 | 0.08 | 2.62 | 2.32 | 2.12 | 2.35 | 6.3 | 2.3 | 2.6 | 1.13 | 1 | 0.208 | 479.6 | 90.8 | 0.19 |
| 15 | 0.16 | 2.79 | 2.51 | 2.34 | 2.55 | 6.1 | 4.2 | 4.4 | 1.05 | 3 | 0.234 | 792.0 | 143.1 | 0.18 |
| 16 | 0.07 | 2.16 | 2.16 | 1.93 | 2.08 | 4.2 | 2.4 | 3 | 1.25 | 2 | 0.267 | 394.5 | 80.0 | 0.20 |
| 17 | 0.10 | 2.97 | 3.38 | 3.38 | 3.24 | 7.8 | 2.1 | 2.5 | 1.19 | 1 | 0.158 | 602.8 | 131.7 | 0.22 |
| 18 | 0.09 | 2.44 | 2.64 | 2.38 | 2.49 | 6.2 | 2.4 | 2.7 | 1.13 | 2 | 0.216 | 499.9 | 98.0 | 0.20 |
| 19 | 0.18 | 2.22 | 3.26 | 3.26 | 2.91 | 6.3 | 3.3 | 5.3 | 1.61 | 2 | 0.185 | 1013.3 | 191.1 | 0.19 |

TABLE 1-continued

Twisted Dice Form Physical Properties Data

| n | Weight (g) | Thickness (mm) 1 | 2 | 3 | Avg. Thick (mm) | Width (mm) | Kinked Length (cm) | Unkinked Length (cm) | Elongation Value (%) | # of Folds | Density (g/cc) | Total Surface Area (mm2) | Z-Directional Surface Area (mm2) | Z-Direction Surface Area Factor (ZSAF) |
|---|---|---|---|---|---|---|---|---|---|---|---|---|---|---|
| 20 | 0.11 | 2.35 | 3.8 | 3.55 | 3.23 | 6.5 | 2.9 | 3.1 | 1.07 | 1 | 0.169 | 645.5 | 142.3 | 0.22 |
| 21 | 0.08 | 1.71 | 2.27 | 2.05 | 2.01 | 6.0 | 2.3 | 2.8 | 1.22 | 1 | 0.237 | 472.7 | 80.4 | 0.17 |
| 22 | 0.13 | 2.23 | 3.15 | 3.21 | 2.86 | 7.7 | 1.7 | 2.9 | 1.71 | 2 | 0.203 | 656.8 | 127.1 | 0.19 |
| 23 | 0.15 | 3.07 | 4.38 | 3.43 | 3.63 | 8.1 | 2.7 | 3.6 | 1.33 | 2 | 0.142 | 903.1 | 189.3 | 0.21 |
| 24 | 0.09 | 2.03 | 2.85 | 2.87 | 2.58 | 6.0 | 2.3 | 3 | 1.30 | 1 | 0.194 | 546.0 | 108.5 | 0.20 |
| 25 | 0.09 | 2.58 | 2.52 | 2.52 | 2.54 | 6.6 | 3.0 | 3.3 | 1.10 | 1 | 0.163 | 636.8 | 117.3 | 0.18 |
| 26 | 0.11 | 2.72 | 2.8 | 2.43 | 2.65 | 7.5 | 2.3 | 2.8 | 1.22 | 1 | 0.198 | 608.2 | 114.0 | 0.19 |
| 27 | 0.11 | 2.5 | 2.64 | 2.71 | 2.62 | 6.1 | 2.5 | 3.2 | 1.28 | 2 | 0.215 | 589.8 | 115.7 | 0.20 |
| 28 | 0.08 | 2.55 | 2.1 | | 2.33 | 5.7 | 2.3 | 2.5 | 1.09 | 1 | 0.241 | 427.8 | 84.6 | 0.20 |
| 29 | 0.08 | 2.64 | 2.42 | 2.3 | 2.45 | 6.0 | 2.3 | 2.4 | 1.04 | 1 | 0.226 | 435.2 | 88.3 | 0.20 |
| 30 | 0.10 | 2.54 | 2.54 | 2.35 | 2.48 | 8.0 | 2.4 | 2.6 | 1.08 | 1 | 0.194 | 584.4 | 104.0 | 0.18 |
| 31 | 0.08 | 2.26 | 2.6 | 2.54 | 2.47 | 6.5 | 1.6 | 2.5 | 1.56 | 1 | 0.200 | 480.4 | 93.7 | 0.20 |
| 32 | 0.13 | 3.03 | 2.87 | 2.59 | 2.83 | 7.0 | 2.7 | 3.3 | 1.22 | 1 | 0.199 | 688.4 | 133.0 | 0.19 |
| 33 | 0.11 | 2.22 | 3.49 | 3.2 | 2.97 | 5.9 | 2.5 | 3 | 1.20 | 1 | 0.209 | 567.2 | 124.1 | 0.22 |
| 34 | 0.10 | 2.28 | 3.52 | 1.91 | 2.57 | 6.0 | 3.3 | 3.4 | 1.03 | 1 | 0.191 | 613.6 | 118.2 | 0.19 |
| 35 | 0.13 | 2.79 | 3.11 | 2.98 | 2.96 | 5.8 | 3.1 | 3.4 | 1.10 | 2 | 0.223 | 630.0 | 135.0 | 0.21 |
| 36 | 0.09 | 3.51 | 3.12 | 2.77 | 3.13 | 6.6 | 2.4 | 2.8 | 1.17 | 1 | 0.155 | 586.4 | 129.1 | 0.22 |
| 37 | 0.07 | 2.26 | 2.61 | 2.56 | 2.48 | 5.5 | 1.7 | 2.6 | 1.53 | 1 | 0.198 | 442.0 | 91.6 | 0.21 |
| 38 | 0.11 | 2.3 | 2.23 | 1.98 | 2.17 | 5.6 | 2.1 | 2.8 | 1.33 | 2 | 0.323 | 459.4 | 85.1 | 0.19 |
| 39 | 0.09 | 2.04 | 2.09 | 2.22 | 2.12 | 5.9 | 2.6 | 2.9 | 1.04 | 2 | 0.249 | 489.9 | 86.4 | 0.18 |
| 40 | 0.09 | 1.83 | 2.18 | 2.22 | 2.08 | 6.0 | 2.5 | 2.9 | 1.16 | 2 | 0.249 | 493.4 | 85.1 | 0.17 |
| 41 | 0.08 | 3.85 | 2.34 | | 3.10 | 5.9 | 1.9 | 2.4 | 1.26 | 1 | 0.183 | 468.3 | 110.8 | 0.24 |
| 42 | 0.10 | 2.61 | 2.55 | 2.33 | 2.50 | 5.7 | 2.2 | 2.5 | 1.14 | 2 | 0.281 | 438.3 | 90.9 | 0.21 |
| 43 | 0.08 | 2.06 | 3.3 | 3.29 | 2.88 | 6.7 | 2.2 | 2.7 | 1.23 | 1 | 0.153 | 556.1 | 116.5 | 0.21 |
| 44 | 0.10 | 2.15 | 3.39 | 3.21 | 2.92 | 6.5 | 2.6 | 2.8 | 1.08 | 2 | 0.188 | 565.3 | 119.6 | 0.21 |
| 45 | 0.08 | 2.8 | 2.79 | 2.54 | 2.71 | 6.0 | 2.0 | 2.4 | 1.20 | 2 | 0.205 | 450.6 | 97.6 | 0.22 |
| 46 | 0.10 | 2.51 | 2.61 | 2.42 | 2.51 | 6.2 | 2.0 | 2.7 | 1.35 | 2 | 0.238 | 501.7 | 99.0 | 0.20 |
| 47 | 0.09 | 2.94 | 2.21 | 2.84 | 2.66 | 6.0 | 2.3 | 2.8 | 1.22 | 2 | 0.201 | 517.1 | 106.5 | 0.21 |
| 48 | 0.09 | 2.93 | 2.77 | 2.56 | 2.75 | 6.2 | 2.1 | 2.9 | 1.38 | 2 | 0.182 | 553.4 | 114.0 | 0.21 |
| 49 | 0.09 | 2.58 | 2.74 | | 2.66 | 6.0 | 2.2 | 2.3 | 1.05 | 2 | 0.245 | 430.3 | 93.1 | 0.22 |
| 50 | 0.11 | 2.51 | 2.65 | 2.93 | 2.70 | 6.4 | 2.9 | 3.3 | 1.14 | 2 | 0.193 | 634.9 | 123.5 | 0.19 |
| AVG | 0.11 | | | | 2.64 | 6.3 | 2.5 | 3.0 | 1.21 | 1.5 | 0.216 | 568.2 | 112.8 | 0.20 |
| HIGH | 0.20 | | | | 3.63 | 8.1 | 4.2 | 5.3 | 1.71 | 3.0 | 0.468 | 1013.3 | 191.1 | 0.24 |
| LOW | 0.05 | | | | 1.94 | 4.2 | 1.6 | 2.0 | 1.03 | 1.0 | 0.142 | 394.5 | 80.0 | 0.16 |
| STD DEV | 0.03 | | | | 0.36 | 0.7 | 0.5 | 0.6 | 0.16 | 0.6 | 0.050 | 124.1 | 25.5 | 0.02 |
| MODE | 0.09 | | | | 2.48 | 6 | 2.3 | 2.9 | 1.2 | 1 | | | | |
| CV | 29% | | | | 14% | 12% | 19% | 19% | 13% | 38% | 24% | 22% | 23% | 8% |

Example 4

Rectangular Dice

CF-16 was manufactured into standard rectangular dice with target dimensions of 5 mm×6 mm with an average density of 0.52 g/cm³ by Shepherd Products (Watertown, Tenn.) using CF-16 Lot Number 270044 supplied in standard Foley roll form by Buckeye Florida (Perry, Fla.).

Seven individual rectangular dice were weighed using a digital analytical balance, Mettler Toledo Model AB204-S, that measures to the nearest 1/10,000 of a gram. Once the weight was recorded in grams for a given individual rectangular dice, the length was measured. The length was defined as the longer longitudinal distance, the Y direction. A Peak Scale Loupe 10× magnifying unit, Model 2028, was used to measure the length. The length was measured to the nearest tenth of a millimeter and recorded and in millimeters. The width was defined as the shorter horizontal distance, the X direction. The Peak Scale Loupe 10× magnifying unit was used to measure the width for a given rectangular dice to the nearest tenth of a millimeter. Width measurements were recorded in millimeters. An Ames Micrometer, Model BG2110-0-04, with a 1.9 centimeter diameter foot was used to measure the thickness of each rectangular dice. The thickness, the Z direction, was obtained by centering the rectangular dice under the 1.9 centimeter foot of the micrometer. Thickness was reported in millimeters to the nearest 1/100 of a millimeter. Density per each given rectangular dice was calculated by taking the weight in grams and dividing by the area of the given rectangular dice. The average thickness in centimeters of the given rectangular dice was divided into the weight per area value to calculate density in grams per cubic centimeters. The average density for the seven rectangular dice is termed the Form Apparent Density and is also expressed in grams per cubic centimeter. For each given rectangular dice, the total surface area was calculated.

The Z-directional surface area was calculated for each given rectangular dice and reported in squared millimeters. The Z-Direction Surface Area Factor (ZSAF) was calculated for each individual rectangular dice by dividing the total surface area into the Z-Direction Surface Area. The individual ZSAF values were averaged for the seven rectangular dice measured. The average ZSAF value was assigned to the rectangular dice form. See Table 2 which shows physical properties data for n=7 rectangular dice.

TABLE 2

Rectangular Dice Form Physical Properties Data

| n | Wt (g) | Length (mm) | Width (mm) | Thickness (mm) | Density (g/cc) | Total Surface Area (mm$^2$) | Z-Directional Surface Area (mm$^2$) | Z-Direction Surface Area Factor (ZSAF) |
|---|---|---|---|---|---|---|---|---|
| 1 | 0.022 | 6.2 | 5.1 | 1.34 | 0.519 | 93.5 | 30.3 | 0.32 |
| 2 | 0.023 | 6.2 | 5.2 | 1.36 | 0.525 | 95.5 | 31.0 | 0.32 |
| 3 | 0.021 | 6.2 | 5.2 | 1.31 | 0.497 | 94.3 | 29.9 | 0.32 |
| 4 | 0.022 | 6.1 | 5.0 | 1.34 | 0.538 | 90.7 | 29.7 | 0.33 |
| 5 | 0.021 | 6.1 | 5.1 | 1.33 | 0.508 | 92.0 | 29.8 | 0.32 |
| 6 | 0.021 | 6.2 | 4.8 | 1.40 | 0.504 | 90.3 | 30.8 | 0.34 |
| 7 | 0.023 | 6.4 | 5.1 | 1.35 | 0.522 | 96.3 | 31.1 | 0.32 |
| AVG | 0.022 | 6.2 | 5.1 | 1.35 | 0.516 | 93.3 | 30.4 | 0.33 |
| HIGH | 0.023 | 6.4 | 5.2 | 1.40 | 0.538 | 96.3 | 31.1 | 0.34 |
| LOW | 0.021 | 6.1 | 4.8 | 1.31 | 0.497 | 90.3 | 29.7 | 0.32 |
| STD DEV | 0.001 | 0.1 | 0.1 | 0.03 | 0.014 | 2.3 | 0.6 | 0.01 |
| MODE | 0.021 | 6.2 | 5.1 | 1.34 | — | — | — | — |
| CV | 4% | 2% | 3% | 2% | 3% | 2% | 2% | 2% |

A preferred application for the practice of this invention is the production of fiber reinforced concrete for construction. There are a wide variety of mixing apparatus in use in the construction trades which range in size from small units such as the four cubic foot mixer used in the laboratory examples below, to various ready-mix truck units in wide use, and to other units. The parameters discussed herein relating to mixing and dispersion of fibrous forms delivered into concrete are applicable to any of the motorized state of the art concrete mixing machines operating under typical ambient conditions.

Desirably, the form of sheeted fibrous material of this invention upon addition to a concrete mixing machine is about 99 percent or more dispersed into individual fibers within a mixing time of about five minutes or less, more desirably of about four minutes or less, preferably of about three minutes or less, and more preferably of about two minutes or less. Mixing time is calculated from the point in time when a batch of sheeted fibrous material form, such as dice, comes into contact in the rotating mixing machine with one or more, or, generally, with most or all of the other ingredients of the concrete batch. 99 percent or more dispersion is determined by visual examination of the concrete to confirm that the fibers are individually dispersed, as, for example, is done in Example 5 below with a series of screens and sieves.

The following Examples 5-8 demonstrate a Laboratory Dispersion Test of three different CF-16 Forms.

Example 5

Dispersion of Rectangular 5 mm×6 mm CF-16 Dice Form in Concrete

A concrete laboratory with temperature controlled to a range of 22.2 to 27.2 degrees Celsius (72 to 81 degrees Fahrenheit) and humidity controlled to a range of 41 percent to 54 percent was utilized for this experiment. A 94 pound (42.64 kilograms) bag of Portland cement (Lone Star Industries Inc., Memphis, Tenn.) was cut open and 30.8 pounds (13.97 kilograms) was scooped into a bucket and covered. Then, 118.0 pounds (53.52 kilograms) of #57 washed coarse aggregate (Vulcan Materials Co., Memphis, Tenn.) was weighed out into buckets. Eighty-three pounds (37.65 kilograms) of concrete sand fine aggregate (Metro Materials Inc., Memphis, Tenn.) was scooped into buckets. Then, 19.6 pounds (8.89 kilograms) of water was weighed out into a bucket. The total weight for the concrete batch was 251.4 pounds (114.04 kilograms). The unit weight of the mix was predetermined to be 155.2 pounds per cubic foot (2.49 kilograms per cubic decimeter). Based on the unit weight of the concrete mix, 40.8 grains, or the equivalent dosage of 1.5 pounds per cubic yard (0.89 kg/m$^3$), of bone dry rectangular CF-16 dice fiber was weighed using a digital balance (Mettler Toledo; Model PB3002-S) and placed in a beaker.

The 53.52 kilograms of #57 aggregate was added to a four cubic foot (113.3 cubic decimeter) concrete mixer (Stone Electric Concrete Mixer; Model 45CM), with the angle of the mixing drum positioned at one notch below the horizontal position that tilted the opening of the mixer upward 15 degrees from horizontal. One third of the 8.89 kilograms of water was added to the mixer containing the #57 aggregate. The mixer was then powered on. The 37.65 kilograms of concrete sand was added while the mixer rotated. The 13.97 kilograms of Portland cement was added to the mixer containing the #57 aggregate and concrete sand. The remaining two thirds of water was added to mixer. The mix rotated for a continuous three minutes and was timed using a stopwatch, which was started after the water was added. After three minutes of mix time, the mixer was powered off and a damp towel was placed over the opening of the mixer for three minutes.

After the three minutes elapsed, the towel was removed and the mixer was powered on and allowed to mix for two minutes. Then 40.8 bone dry grams of the 5 mm×6 mm rectangular CF-16 cellulose dice were added into the mixer all at once, making sure no dice collided with the mixing paddles or blades. Timing began and every 30 seconds, the mixer was powered off and a 15 pound (6.80 kilogram) sample was scooped out of the mixer and into an individual bucket. The mixer was immediately powered back on after the sample was collected. One sample weighing 15 pounds (6.80 kilograms) was scooped out every 30 seconds until eight buckets of samples were collected over the time span of four minutes. The buckets were labeled according to the time at which they were collected.

Each sample was emptied onto a 40.0 centimeter by 65.2 centimeter screening tray. An upper screening tray, which contained the concrete sample initially, was entirely perforated on the bottom with 6.3 millimeters inside diameter openings spaced apart every 3.3 millimeters. Underneath the top screen was a lower screening tray that measured 40.0 centimeters×65.2 centimeters, which was completely perforated with 3.0 millimeters opening spaced apart every 2.3 millimeters. A collecting pan was placed underneath the lower tray. Samples were spread out by hand across the upper screen. A water hose with a spray gun attachment set to shower gently washed the cement paste, sand, and small rocks through the two screening trays into the collection pan. Undispersed rectangular dice and fiber pieces that were not completely dispersed were collected by hand off of the two screen trays and put onto a standard sieve with 0.150 millimeter openings. The fiber collected was washed with water on the 0.150 millimeter opening standard sieve. The fiber was continuously rinsed until the cement paste no longer appeared on the fibers. The color change from gray to white indicated that the cement paste had washed away. The cleaned wet fiber was pressed down onto the lower sieve to press out as much water as possible. The screens and sieves were washed after each sample. The screening and sieving process to collect fiber was repeated for each sample. The samples were labeled and transferred to an oven set at 105 degrees Celsius and dried overnight.

The collected fiber was removed from the oven the next day. The dried fiber was then separated using dissecting needles to break apart the fiber and release any sand caught between the fibers. The separation with dissecting needles was performed on top of a standard sieve with 1.7 millimeter openings to allow the sand to fall through the openings. The remaining fiber that was free of sand was placed in a separate container. This process was repeated for each fiber sample. The total weight of CF-16 5 mm×6 mm Rectangular Dice fiber recovered from each sample was recorded and reported in Table 3 (below). The CF-16 5 mm×6 mm rectangular dice completely was completely dispersed in a mixing time of between 2.50 minutes and 3 minutes. The CF-16 5 mm×6 mm rectangular dice has a CFDC of 0.64.

Example 6

Dispersion of CF-16 Twisted Dice Form in Concrete

The procedure of Example 5 was repeated using twisted dice instead of rectangular dice. The CF-16 twisted dice was completely dispersed in a mixing time of between 2 minutes and 2.50 minutes. The CF-16 Twisted Dice has a CFDC of 0.93.

Example 7

Dispersion of 3 Inch (7.62 cm)×4 Inch (10.26 cm) Sheet Form in Concrete 2 Minute Mix Time The procedure of Example 5 was repeated using seven individual sheets of fiber that when stacked together measured a total height of 9.16 millimeters. Each individual sheet had a basis weight of 746 grams per square meter and a density of 0.57 grams per cubic centimeter. After mixing the sheeted fiber into the concrete for two minutes, the entire batch was dumped and sieved. The recovered fiber weighed 40.567 grams. A normalized value, that is, the weight of fiber per scoop, was calculated to be 2.420 g. The CFDC for this sheet form is 0.05.

Example 8

Dispersion of 3 Inch (7.62 cm)×4 Inch (10.26 cm) Sheet Form in Concrete 4 Minute Mix Time The procedure of Example 5 was repeated using seven individual sheets of fiber that when stacked together measured a total height of 9.16 millimeters. Each individual sheet had a basis weight of 746 grams per square meter and a density of 0.57 grams per cubic centimeter. After mixing the sheeted fiber into the concrete for four minutes, the entire batch was dumped and sieved. The recovered fiber weighed 2.146 grams. A normalized value, that is, the weight of fiber per scoop, was calculated to be 0.128 g. The CFDC for this sheet form is 0.05.

TABLE 3

| | Recovered Fiber (grams) | | | |
|---|---|---|---|---|
| Mix Time (minutes) | Rectangular CF-16 5 mm × 6 mm Dice | CF-16 Twisted Dice | CF-16 Sheet 3" × 4" | **Normalized CF-16 Sheet |
| 0.50 | 3.494 | 2.687 | | |
| 1.00 | 2.387 | 1.419 | | |
| 1.50 | 1.045 | 0.244 | | |
| 2.00 | 0.484 | 0.008 | 40.567 | 2.420 |
| 2.50 | 0.020 | 0 | | |
| 3.00 | 0 | 0 | | |
| 3.50 | 0 | 0 | | |
| 4.00 | 0 | 0 | 2.146 | 0.128 |
| ZSAF | 0.33 | 0.20 | | 0.03 |
| Form Apparent Density (g/cc) | 0.516 | 0.216 | | 0.570 |
| CFDC | 0.64 | 0.93 | | 0.05 |

Figure 2:
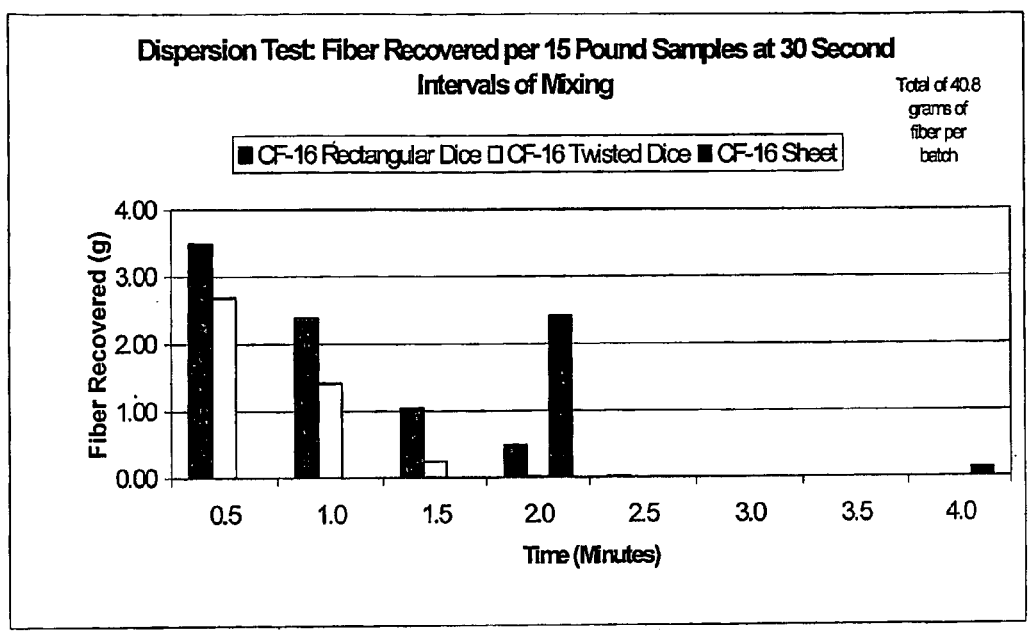
FIG. 2 shows the results of dispersion tests as a direct correlation between the FFDC or CFDC for cellulosic forms (CF-16 rectangular dice, CF-16 twisted dice, and CF-16 sheets) and mixing times. Specifically, the fiber recovered was measured per 15 pound sample at 30 second intervals of mixing.

The result from Examples 5-8 are shown in FIG. 2. There is a direct correlation between the FFDC or CFDC for these cellulosic forms and the mixing time.

Example 9

Low Consistency Slurry

A pour was done to extend a residential driveway. I.M.I., Inc. of Tennessee prepared the concrete to the following mix design:

290.7 kilograms/meter$^3$ (490 lbs./yd$^3$) of cementitious material (62.1 kg fly ash, 160.1 kg cement);

1112.4 kilograms/meter$^3$ (1875 lbs./yd$^3$) of number 57 crushed limestone rock;

783.1 kilograms/meter$^3$ (1320 lbs./yd$^3$) of sand; and

988 Liters (261 gallons) of water for a target slump of 12.7 centimeters (5.0 inches).

A 3.5% consistency slurry of CF16 was prepared by adding 8.2 bone dry kilograms (18 bone dry pounds) of sheeted CF-16 (basis weight of 709 g/m$^2$ and a sheet density of 0.59 g/cm$^3$) into approximately 215.8 liters (57 gallons) of water. The mixture was agitated until the CF-16 had broken up into individualized fibers. The entire slurry was added to the truck inlet chute using 18.9 Liter (5-gallon) buckets containing the CF-16 slurry. This was equivalent to a 1.19 kilogram/meter$^3$ (2.0 lbs./yd$^3$) dosage of fibers into the concrete for the 6.9 meter$^3$ (9 yd$^3$) truck being used. After the slurry was added into the truck, it proceeded to the concrete batch station to receive the full concrete mix load (cement, sand, rock, and water). The concrete mix design was adjusted so that 215.8 liters (57 gallons) of water were withheld to accommodate for the water delivered from the fiber slurry. The truck rotated at high mixing speed while being charged with all the concrete materials. The truck then traveled 10-12 minutes to the pour site at drive rotation speed (low speed).

Slump measured 18.4 centimeters (7.25 inches) for the concrete containing the slurry. The truck operator had targeted a 12.7 centimeters (5.0 inches) slump but had not accounted for any water in the sand or aggregate even though there had been heavy rains the night before and might explain the higher than expected slump. Visual observations confirmed that the fiber was well dispersed throughout the entire concrete batch. A concrete sample was collected during the pour and then washed with water from a garden hose over a No. 14 sieve and the sand and fiber was collected on a No. 100 sieve and washed. Individual fibers were present and no clumps were noticed. Three cylinders samples were also collected which will be used to measure compressive strength at 7 and 28 days cure times. The finishing process was uneventful.

Example 10

Concrete Prepared with Twisted Dice

A residential pour was carried out to extend a driveway. The concrete was prepared by I.M.I., Inc to the following mix design:
- 290.7 kilograms/meter$^3$ (490 lbs./yd$^3$) of cementitious material (62.1 kg fly ash, 160.1 kg. cement);
- 1112.4 kilograms/meter$^3$ (1875 lbs./yd$^3$) of number 57 crushed limestone rock;
- 783.1 kilograms/meter$^3$ (1320 lbs./yd$^3$) of sand; and
- 988 Liters (261 gallons) of water for a target slump of 12.7 centimeters (5.0 inches).

The truck was prepared by I.M.I. according to the above mix plan. When the truck arrived at the pour site, slump was measured and found to be 8.9 centimeters (3.50 inches). Cylinders for compressive strength testing were also collected. Nine degradable cellulose bags, each containing 0.68 kilograms bone dry (1.5 pounds) of CF-16 dice were quickly added one-by-one into the truck via the inlet chute for a total addition of 6.1 kilograms (13.5 lbs.) of fiber. This equates to a fiber dosage of 0.89 kilograms/meter$^3$ (1.5 lbs./yd$^3$). The truck rotated at full mix speed for 5 minutes before pouring commenced. A sample was collected to measure slump and test for fiber dispersion. The slump measured 5.7 centimeters (2.25 inches) after the fiber was added (approximately 2.5 centimeter (1.0 inch) slump reduction). Cylinders were collected for compression strength. The fibers were easily visible in these collected samples. After the samples were collected, the truck operator added water to raise the slump so it would be easier to finish. Once pouring began, no clumps or "non-dispersed" pieces of dice were ever observed during pouring or finishing. Several large concrete samples were taken throughout the pour and were washed over two sieves to collect CF-16 fibers. In every case, these tests confirmed the presence of thoroughly mixed and individualized fibers.

An identical mix of CF-16 dice was repeated immediately following the above pour. The same amount was added in the same manner and with the same mixing conditions. The slump prior to CF-16 addition measured 5.1 centimeters (2.00 inches); after CF-16 addition it measured 3.2 centimeters (1.25 inches). Samples were collected for compressive strength testing and fibers were visually present in the samples that contained CF-16. The truck driver again added water to the mix to make the concrete more workable. No clumps or "non-dispersed" pieces of dice were noticed when pouring and individual fibers were again observed using the sieves after washing.

Once again the finishing crew noted no problems or events related to finishing the concrete containing CF-16.

Example 11

Concrete Prepared with Rectangular 5 mm×6 mm CF-16 Dice

CF-16 was manufactured into standard rectangular dice with dimensions of 5 mm×6 mm with an average density of 0.52 g/cm$^3$. This converting was done by Shepherd Products (Watertown, Tenn.) using CF-16 Lot Number 270044 supplied in standard Foley roll form. The dice was packaged into degradable bags by Durafiber Inc. with each bag containing 0.68 kilograms (1.5 lbs.) of diced C-16.

A test pour occurred at Hoover Concrete, Inc. (Nashville, Tenn.). A rectangular pit approximately 3.66 meter (12')× 7.32 meter (24') with a depth range of 15.2-25.4 centimeters (6-10 inches) was created to receive the pour contents. The concrete batch was 6.9 cubic meters (9 yd$^3$) of standard 20.7 megapascals (3,000 psig) mix concrete. The truck was initially filled and mixed to completion with all the concrete materials. A sample of the concrete was collected to test for slump and to fill compressive strength cylinders for 14 and 28 days. The slump measured 17.8 centimeters (7.0 inches).

Next, the CF-16 fiber was added in rectangular dice form (5 mm×6 mm) via eleven degradable bags containing 0.68 kilograms (1.5 lbs.) of dice each for a total addition of 7.5 kilograms (16.5 lbs.) or a dosage of 1.07 kilograms/meter$^3$ (1.8 lbs./yd$^3$). The bags were quickly added one-by-one and given 4.5 minutes of full rotational speed mix time. The concrete was then poured into the pit for approximately 30 seconds before a sample was collected. The sample containing CF-16 fiber measured a 17.8 centimeters (7.0 inch) slump. Cylinders for compressive strength were also obtained for 14 day and 28 day measurements. No additional water was added at any point during the pour.

A dispersion test was also performed on the concrete to look for undispersed dice or fiber bundles. Approximately 11.3 kilograms (25 lbs.) of concrete was placed onto a 1.9 centimeter (0.75 inch) round screen. The sample was spread out and washed lightly with water onto a 0.3 centimeter (0.125 inch) round screen. A pan caught whatever passed through the two screens and the test showed that the first sample contained only individualized fibers (no dice or fiber bundles). The filtrate collected on the bottom pan was further screened using standard No. 12 and No. 100 mesh screens. The sand mixture collected on the No. 100 mesh was allowed to drain and dry in the sun. Agitation of the sand mixture after it had dried revealed individual CF-16 fibers dispersed all throughout the filtrate that had passed through the three screens. Once again, dispersion was confirmed.

A second sample was collected near the end of the pour. The slump measured 21.0 centimeters (8.25 inches). The increase in slump is typical due to water settlement. The fiber dispersion test was performed again with about 11.3 kilograms (25 lbs.) of concrete and revealed only one single piece of dice. It should be noted that a total of approximately 340,200 individual pieces of dice were added to the truck. Each individual dice weighs approximately 0.022 grams on average. This single dice is believed to have been stuck to the inlet chute and fallen off during discharge and, therefore, had essentially no mix time. Fiber dispersion was once again confirmed successful by viewing the contents of the No. 100 mesh screen after it had dried in the sun.

The finishers commented that the concrete worked and finished normally with no problems and no undispersed fibers were observed during the finishing process.

Comparative Example 11A

A comparative test was then made with delivery of fibers in sheet form. A different pour was scheduled at Hoover Concrete, Inc. (Nashville, Tenn.). The concrete batch was 6.9 m³ (9 yd³) of standard 20.7 megapascals (3,000 psig) mix concrete. Three different size sheets of CF-16 were used: 4.54 kilograms (10 lbs.) of 5.1 centimeter (2")×29.2 centimeter (11.5"), 4.54 kilograms (10 lbs.) of 7.6 centimeter (3.0")×29.2 centimeter (11.5"), and 2.27 kilograms (5 lbs.) of 10.2 centimeter (4") by 29.2 centimeter (11.5") (machine direction in the 11.5" dimension). Each sheet had an average basis weight of 709 g/m² and an average density of 0.59 g/cm³.

The truck was initially filled and mixed to completion with all the concrete materials. Then the fiber sheets were added in bundles into the inlet chute of the concrete truck and were allowed to mix for 4 minutes at full rotational speed.

The pour site was on-location at Hoover where a section of their property had been dug out to receive the concrete. As the pour took place, rakes were used to search through the concrete looking for unmixed sheets of fibers. Attempts were made to quantify any unmixed fiber sheets. Table 4 below summarizes the unmixed quantities:

TABLE 4

Sheets Recovered According to Size

|  | 5.1 cm Wide | 7.6 cm Wide | 10.2 cm Wide | Sum |
|---|---|---|---|---|
| Number of Sheets | 81 | 64 | 14 | 159 |
| Dry Weight (lbs.) | 0.853 | 1.012 | 0.295 | 2.16 |
| percent Recovered | 19% | 22% | 13% | 19% Avg. |

While the table above represents what was found unmixed in the concrete using rakes, etc., it most likely does not represent all of the unmixed portions of fiber sheets. This method of fiber addition proved to not be successful under the needed mix conditions required at a typical ready mix batch plant for sheeted CF-16.

The CF-16 Fiber Identification Procedure included the following steps:
1. Fill a 1 liter container half way with the concrete containing the fiber.
2. Using a water source with a spray nozzle, fill the remaining half of the container with water and tamp the concrete with a tamping rod 10 times.
3. Pour off the liquid containing the fiber or the top layer onto a 100-mesh sieve. Prevent the aggregate and sand from pouring out onto the sieve.
4. Gently rinse off the cement paste through the sieve until the collected fiber turns from a grey to white color.
5. Confirmation of fiber can be collected in sample bags by rolling the fiber into a ball and squeezing out the water.

For Examples 12-14, the concrete mix design was a 27.6 Megapascal (4000 pounds per square inch (PSI)) mix with pea gravel as the coarse aggregate. The concrete for these examples were made at Lonestar Industries Incorporated (Memphis, Tenn.) ready mix plant. The concrete was cement only, meaning there was not slag nor fly ash. In each of Examples 12-14, the duration of mixing speed is reviewed for dispersion of fibers.

Example 12

Concrete Prepared with Rectangular 5 mm×6 mm CF-16 Dice Added to an Already Batched Concrete Truck CF-16 dice were added to a 6.9 cubic meter (9 cubic yards) concrete truck at the pour site or the tail end of the batch process. The dice were contained in degradable cellulose bags. The concrete was a 27.6 Megapascal (4000 PSI) mix ordered from Lonestar Industries Incorporated (Memphis, Tenn.). The coarse aggregate in the mix was pea gravel. CF-16 dosage was 0.89 kilograms/cubic meter (1.5 pounds per cubic yard) of concrete. After CF-16 dice were added, the truck mixed at mix speed for 3 minutes. The dispersion test showed the dice were not dispersed into individual fibers. The concrete drum mixed at mix speed for 2 more minutes. The CF-16 did not disperse after the additional 2 minutes of mix time. The drum then mixed for another 2 minutes. The CF-16 did not disperse after the second 2 minute mix time interval. The drum then mixed for 4 more minutes at mix speed. The dispersion test showed that the dice did not disperse but only had begun to swell. The dice did not disperse after a total of 11 minutes mix time when the dice were added to an already batched concrete truck or at the tail end of the batch process. The slump was measured to 12.7 centimeters (5 inches). The top surface of the concrete driveway revealed pea gravel along with numerous CF-16 dice that did not disperse into individual fibers.

Example 13

Concrete Prepared with Loose Rectangular 5 mm×6 mm CF-16 Dice Added First to Concrete Truck During the Batch Process Loose CF-16 dice were added to the conveyor belt that loads materials into the concrete truck at a ready mix plant. The dice were conveyed into the truck drum ahead of all other materials (coarse aggregate, fine aggregate, cement, and water). The coarse aggregate used in this example was pea gravel. CF-16 dosage was 0.89 kilograms per cubic meter (1.5 pounds per cubic yard of concrete). The batch time to add the materials to form the concrete measured 3 minutes. The drum of the truck then mixed at mix speed for 3 minutes. The dispersion test showed that the dice dispersed completely after 3 minutes of mix time. The slump of the concrete measured 8.9 centimeters (3.5 inches). After the top surface was removed to expose the aggregate, no signs of dice were visible.

Example 14

Concrete Prepared with Bagged Rectangular 5 mm×6 mm CF-16 Dice Added First to Concrete Truck During the Batch Process Bagged CF-16 dice were added to the conveyor belt that loads materials into the concrete truck at a ready mix plant. The dice were conveyed into the truck drum ahead of all other materials (coarse aggregate, fine aggregate, cement, and water). The coarse aggregate used in this example was pea gravel. CF-16 dosage was 0.89 kilograms per cubic meter (1.5 pounds per cubic yard of concrete). The batch time to add the materials to form the concrete measured three minutes. The drum of the truck then mixed at mix speed for three minutes. The dispersion test showed that the dice dispersed completely after three minutes of mix time. The slump of the concrete measured 10.2 centimeters (4.0 inches). After the top surface was removed to expose the aggregate, no signs of dice were visible.

For Examples 15 and 16, the concrete was a 27.6 Megapascals (4000 PSI) mix containing pea gravel as the coarse aggregate. For each example, 6.9 cubic meters (9 cubic yards) were made per truck. There was not any fly ash or slag added to the concrete mix in both examples. Examples 15 and 16 pertain to an Irving Materials Incorporated (Manchester, Tenn.) ready mix plant.

Example 15

Concrete Prepared with Rectangular 5 mm×6 mm CF-16 Dice Added after the First Component of the Concrete Mix Rectangular 5 mm×6 mm CF-16 Dice were loaded into the storage bin of a screw auger conveying system (SACS), which is described below already installed at a ready mix plant owned by Irving Materials Incorporated (Manchester, Tenn.). The SACS was installed to deliver or dispense CF-16 dice to the aggregate weigh hopper. The flow rate or dispensing rate of the SACS was measured. The measured flow rate was utilized for calculating the run time of the SACS to meter in the targeted amount of fiber. The target batch volume of concrete to be loaded into the concrete truck was 6.9 cubic meters (9 cubic yards). The calculated run time was entered to deliver 6.1 kilograms (13.5 pounds) of CF-16 dice given the known flow rate at the discharge end of the SACS.

The coarse aggregate used was pea gravel. The pea gravel was dropped into the weigh hopper first. The CF-16 dice was dispensed on top of the pea gravel or after the pea gravel was loaded into the weigh hopper. The weigh hopper contained an aggregate outlet at the bottom of the weigh hopper. A conveyor belt was directly below the aggregate outlet. The conveyor belt was powered on and delivered pea gravel first into the drum of the concrete truck during the concrete batch process. After the pea gravel conveyed into the drum of the truck, the CF-16 dice was added next as the second component of the concrete mix. Directly, behind the CF-16 followed the sand. Some sand and CF-16 dice were loaded into the drum of the concrete truck simultaneously. Cement and water were added last.

After the drum of the truck was loaded, the drum rotated at mix speed for three minutes. The dispersion test showed that the CF-16 dice had not yet dispersed. The drum was given another two minutes of mix time at mix speed. The dispersion test showed the dice were swollen but not dispersed. The drum of the truck was mixed at mix speed for one additional minute. The dispersion test confirmed complete dispersion of the CF-16 dice after a total of 6 minutes. The top surface of the slab was exposed to reveal the pea gravel. There were no visible signs of dice or undispersed fiber on the exposed surface and this supported the dispersion test result.

Example 16

Concrete Prepared with Rectangular 5 mm×6 mm CF-16 Dice Added Simultaneously with the First Component of the Concrete Mix Rectangular 5 mm×6 mm CF-16 Dice were loaded into the storage bin of a screw auger conveying system (SACS) already installed at a ready mix plant owned by Irving Materials Incorporated (Manchester, Tenn.). The SACS was installed to deliver or dispense CF-16 dice to the aggregate weigh hopper. The flow rate or dispensing rate of the SACS was measured. The measured flow rate was utilized for calculating the run time of the SACS to meter in the targeted amount of fiber. The target batch volume of concrete to be loaded into the concrete truck was 6.9 cubic meters (9 cubic yards). The calculated run time was entered to deliver 6.1 kilograms (13.5 pounds) of CF-16 dice given the known flow rate at the discharge end of the SACS.

The coarse aggregate used was pea gravel. The CF-16 dice were dispensed into the weigh hopper first. The pea gravel were loaded into the weigh hopper on top of the CF-16 dice. The weigh hopper contained an aggregate outlet at the bottom of the weigh hopper. A conveyor belt was directly below the aggregate outlet. The conveyor belt was powered on and delivered CF-16 Dice and pea gravel simultaneously first into the drum of the concrete truck during the concrete batch process. After the CF-16 dice and pea gravel conveyed into the drum of the truck, the sand was added next into the concrete mix. Cement and water were added last.

After the drum of the truck was loaded, the drum rotated at mix speed for three minutes. The dispersion test showed that the CF-16 dice had completely dispersed excluding one bundle of fiber that resembled the origins of an individual piece of dice. The drum was given another one more minute of mix time at mix speed. The dispersion test showed the dice were completely dispersed. The dispersion test confirmed complete dispersion of the CF-16 dice after a total of four minutes. The top surface of the slab was exposed to reveal the pea gravel. There were no visible signs of dice or undispersed fiber on the exposed surface and supported the dispersion test result.

Example 17

Screw Auger Conveying System (SACS)

Rectangular 5 mm×6 mm CF-16 Dice is the preferred form for the SACS. The size and FFDC makes the CF-16 Dice preferable. The size coupled with the FFDC makes the Rectangular 5 mm×6 mm a flowable form and a form that disperses readily in concrete. The SACS is an example of a machine to deliver fiber into the actual process of making concrete such as a ready mix plant. The SACS consists of 3 main functional components. The components are the storage bin, the auger system, and the discharge. The SACS is similar to those manufactured by VAL-CO PAX, INC. (Coldwater, Ohio). The CF-16 dice are preferred since the size and density is highly uniform. A reliable machine coupled with a uniform form of fiber allows for a steady flow rate dispensing from the SACS. The steady flow rate allows a measurement to be taken and applied for future fiber charges. The SACS with the proper electronics can be utilized to reliably meter in targeted amounts of fiber by varying operating time of the auger.

The storage bin is constructed by rope caulking then bolting together sections of steel or other type of material to form a weatherproof container that has an opening at the top for loading the storage bin and another opening at the bottom that serves as an auger feed inlet. The bottom portion of the storage bin is tapered and allows CF-16 Dice to gravity feed into the auger inlet boot directly below the storage bin. The flowable nature (geometry and density) of the CF-16 dice leads to the dice caving in on itself as the auger inlet carries away dice from the center of the storage bin. A hole is temporarily generated in the middle of the dice contained within the storage bin. This hole quickly is filled by dice collapsing in from the side walls of the described hole. Connected to the bottom of the storage bin is the auger feed inlet boot.

The auger system is a flexible screw or helical auger with a 6.88 centimeters (2.71 inches) outside diameter (for this example). Tubing is run from the auger inlet boot to the discharge end of the SACS. The flexible auger is inserted into the tubing. Each end of the auger is terminated. One end of the auger is secured to a freely rotating end in the auger inlet boot under the storage bin. The other end of the auger is secured to a drive end on the discharge side of the SACS. As the auger is driven by the motor, CF-16 dice is conveyed from the storage bin and through the tubing and up to the discharge head.

The discharge head is mounted in position to where the CF-16 dice will dispense into the ready mix batch process or any other process. The CF-16 dice is gravity driven once they reach the discharge head. A discharge tube is assembled to allow the dice to be directed at a targeted point. The drive motor is located next to the discharge head.

Example 18

Cellulose Pellets

Pelletized southern softwood kraft fibers, prepared as described in U.S. Pat. No. 6,270,883 B1, are mixed into a 1:1:2 mixture of Type I Lonestar Portland Cement, sand and pea gravel. The water to cement ratio is 0.51. The components are mixed in a 12 quart Hobart mixer, Model A-120, for 13 minutes. The slump of the mixture is measured in 15 cm laboratory mini-slump cones, Tech-Lab Industries, Inc. (Arlington, Tex.), and found to be 7.0 cm. The concrete mixture with fiber and a control without fiber are poured into stress riser molds as described in ASTM provisional procedure "Standard Test Method for Evaluating Plastic Cracking of Restrained Concrete (Using a Steel Form Insert; Subcommittee C 9.42 Fiber Reinforced Concrete Ballot)", and finished. The samples are placed in front of a fan with air flow 19.1 km/hr. After 24 hours, crack area is measured, and found to be reduced for the fiber containing sample relative to the control.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

Patents, patent applications, publications, product descriptions, and protocols are cited throughout this application, the disclosures of which are incorporated herein by reference in their entireties for all purposes.

What is claimed is:

1. A rectangular dice form of sheeted fibrous material in which the rectangular dice has a generally rectangular shape with a length of from about 4 mm to about 10 mm, a width of from about 3 mm to about 8 mm and a thickness of from about 1 mm to about 2 mm, a density of from about 0.4 g/cc to about 0.6 g/cc, wherein the dice has a fiber form dispersion coefficient FFDC of about 0.30 or greater, and wherein the form of sheeted fibrous material, upon addition to a concrete mixing machine, is about 99 percent or more dispersed into individual fibers within a mixing time of about five minutes or less.

2. The rectangular dice of claim 1, wherein the density is from about 0.45 g/cc to about 0.55 g/cc.

3. The rectangular dice of claim 1, wherein the length is from about 5 mm to about 8 mm.

4. The rectangular dice of claim 3, wherein the length is from about 6 mm to about 7 mm.

5. The rectangular dice of claim 1, wherein the width is from about 4 mm to about 7 mm.

6. The rectangular dice of claim 5, wherein the width is from about 4.5 mm to about 6 mm.

7. The rectangular dice of claim 1, wherein the thickness is from about 1.15 mm to about 1.70 mm.

8. The rectangular dice of claim 7, wherein the thickness is from about 1.25 mm to about 1.50 mm.

9. The rectangular dice of claim 1, wherein the weight is from about 0.015 grams to about 0.030 grams.

10. The rectangular dice of claim 9, wherein the weight is from about 0.020 grams to about 0.024 grams.

11. The rectangular dice of claim 1, wherein the dice has a fiber form dispersion coefficient FFDC of about 0.50 or greater.

12. The rectangular dice of claim 11, wherein the dice has a fiber form dispersion coefficient FFDC of about 0.60 or greater.

13. The rectangular dice of claim 12, wherein the dice has a fiber form dispersion coefficient FFDC of about 0.70 or greater.

14. The rectangular dice of claim 13, wherein the dice has a fiber form dispersion coefficient FFDC of about 0.80 or greater.

15. The rectangular dice of claim 14, wherein the dice has a fiber form dispersion coefficient FFDC of about 0.90 or greater.

16. The rectangular dice of claim 1, wherein the sheeted fibrous material, upon addition to a concrete mixing machine, is about 99 percent or more dispersed into individual fibers within a mixing time of about four minutes or less.

17. Construction material containing dispersed therein the rectangular dice of claim 1, wherein the material is a cementitious mixture, or wherein the material is a bituminous mixture.

18. The rectangular dice of claim 17, wherein the sheeted fibrous material, upon addition to a concrete mixing machine, is about 99 percent or more dispersed into individual fibers within a mixing time of about three minutes or less.

19. A process for the production of a rectangular dice form of a sheeted fibrous material comprising passing the sheeted fibrous material through a dicer to produce rectangular dice which has a generally rectangular shape with a length of from about 4 mm to about 10 mm, a width of from about 3 mm to about 8 mm and a thickness of from about 1 mm to about 2 mm, a density of from about 0.4 g/cc to about 0.6 g/cc, wherein the dice has a fiber form dispersion coefficient FFDC of about 0.30 or greater.

* * * * *